United States Patent [19]

Drucker

[11] 3,946,387

[45] Mar. 23, 1976

[54] METHOD AND APPARATUS FOR ADJUSTMENT OF MODULATION COURSE PATTERNS IN A NAVIGATIONAL SYSTEM

[75] Inventor: Elliott H. Drucker, Seattle, Wash.

[73] Assignee: The Boeing Company, Seattle, Wash.

[22] Filed: Aug. 26, 1974

[21] Appl. No.: 500,541

[52] U.S. Cl. ............................. 343/109; 343/108 R
[51] Int. Cl.$^2$ .......................................... G01S 1/14
[58] Field of Search ........................ 343/108 R, 109

[56] References Cited
UNITED STATES PATENTS

| | | | |
|---|---|---|---|
| 3,482,247 | 12/1969 | Thompson | 343/109 |
| 3,760,419 | 9/1973 | Poschadel et al. | 343/109 |

Primary Examiner—Maynard R. Wilbur
Assistant Examiner—T. M. Blum
Attorney, Agent, or Firm—Christensen, O'Connor, Garrison & Havelka

[57] ABSTRACT

A method and apparatus for adjusting the modulation signal levels of overlapping beams which define along points of equal signal levels within the overlap a directional axis which in turn defines a desired navigation course for an airplane or similar maneuverable apparatus. At points offset from the directional axis, one or the other of the modulation signals will be greater in magnitude, depending on the direction of offset. The included angle between the two locus of points representing a predetermined difference in magnitude between the two modulating signals over the region between the landing field and the farthest reach of the beams defines the modulation course width for that particular difference in magnitude. In the illustrated embodiments, such a modulation course width may be effectively increased or decreased for a given antenna configuration and a given directional axis by altering the magnitudes of the modulation signals such that the difference in modulation levels is decreased or increased throughout the area of beam overlap. This is accomplished by introducing a portion of the modulation signal from one beam forming circuit into the other beam forming circuit, and vice-versa, such that each radiated beam includes components of both modulation signals.

8 Claims, 7 Drawing Figures

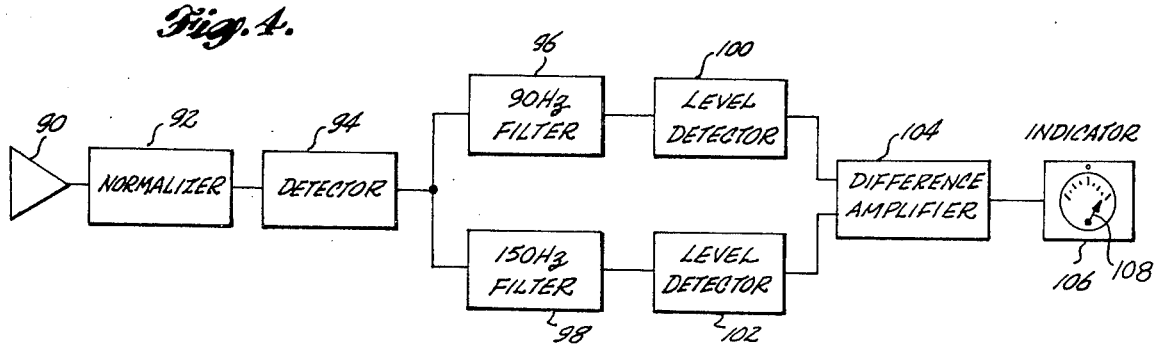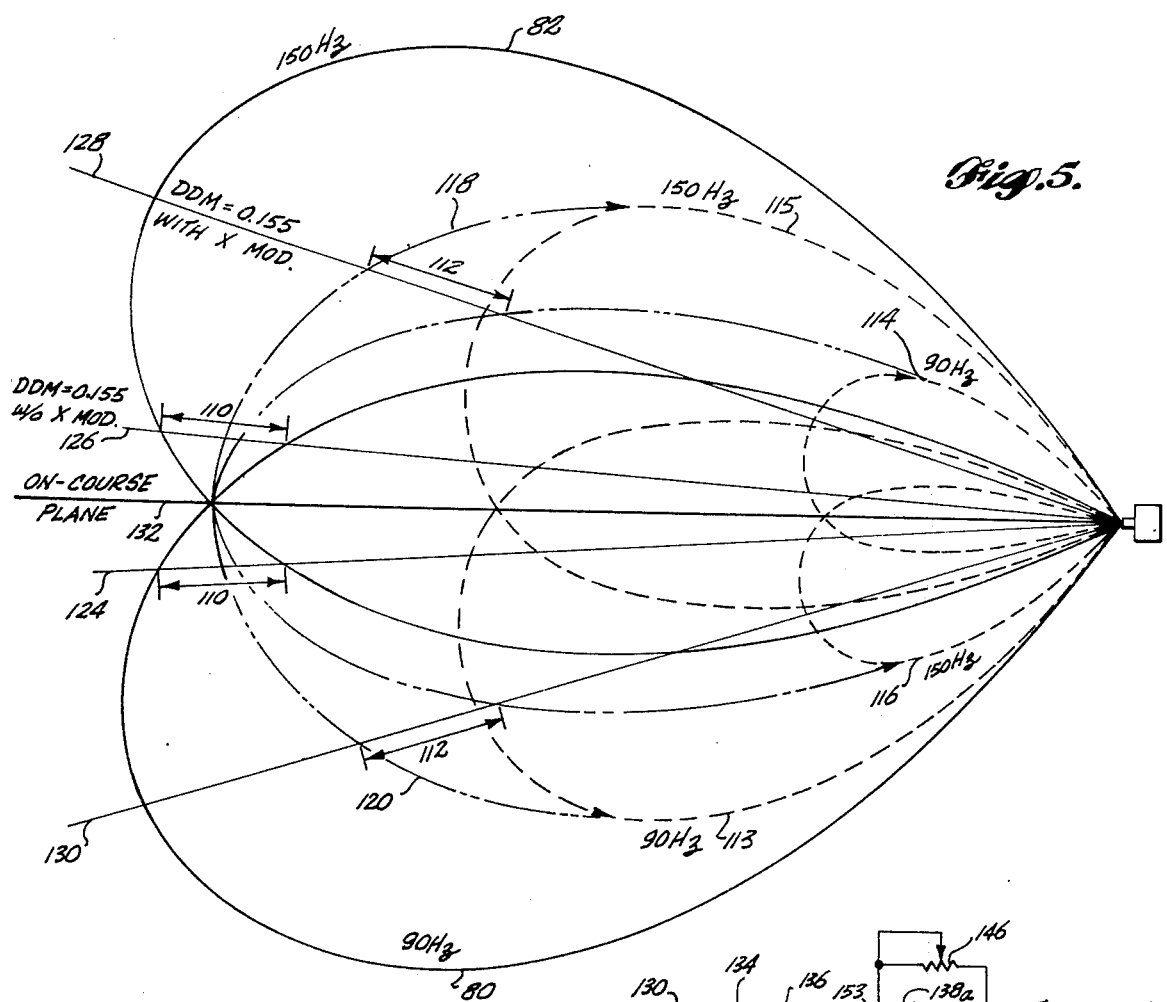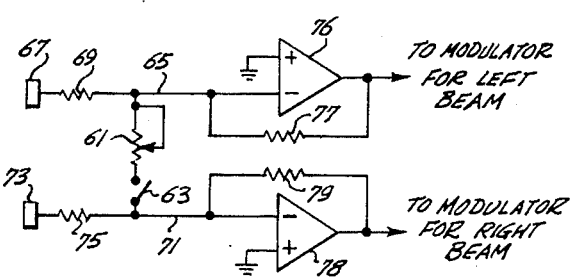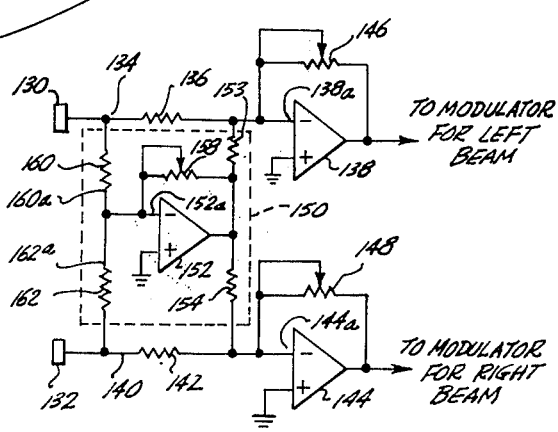

METHOD AND APPARATUS FOR ADJUSTMENT OF MODULATION COURSE PATTERNS IN A NAVIGATIONAL SYSTEM

BACKGROUND OF THE INVENTION

This invention relates generally to navigation systems, and more particularly concerns improvements in navigation systems which use overlapping modulated beams to define a desired navigation path.

In certain navigation systems, such as an instrument landing system (ILS) for aircraft, two or more carrier beams of the same frequency are typically modulated with different audio frequencies and overlapped in transmission to produce a desired navigational path in space defined by a succession of spatial points at which the modulation signal levels from the overlapped beams are equal. In a typical ILS system, four orthogonal modulated beams are generated, a first pair of beams in one plane having a first carrier frequency providing glide slope (up-down) information, and a second pair of beams having a second carrier frequency and being mutually perpendicular to the first pair of beams in a second plane providing localizer (azimuth) information. The four modulated beams are generated by one or more transmitters positioned adjacent the aircraft landing runway and transmitted to an approaching aircraft. A receiver in the aircraft compares the signal level of the modulation signals in each of the first and second pairs of beams, respectively, and generates output signals representative of glide slope and localizer position of the aircraft relative to the desired landing path, which output signals are in turn applied to a visual indicator for inspection by the pilot. When the modulation signal levels of a given pair of beams are equal, the indicator needle will be centered, and the airplane is thus known to be on the desired landing path.

The receiver in the aircraft is typically linearly responsive to the received signals within the needle range of the indicator. Thus equal increments of increased distance or offset of the aircraft from the desired course will result in equal increments of needle movement in the indicator toward one or the other ends of the indicator scale. When the indicator needle is "pegged," (i.e. at one end of the scale), the pilot has no way of telling how much further, if any, his aircraft is offset from the desired course beyond the amount represented by the end of the scale. Thus, spatial boundaries for a navigation system are typically defined by the linear response range of the aircraft receiver, which is coordinated with the ends of the indicator scale. This is true for both glide slope and localizer signals.

For a typical ILS installation, the included angle of the localizer signal which can be incrementally sensed by the aircraft indicator is 3 to 3½ degrees, while for glide slope it is approximately 3°, although the values may vary slightly from receiver to receiver. The included beam angle relative to the desired navigation path over which the indicating system is linearly responsive is referred to as the course width of the navigation system. The boundaries of the course width, between which the response of the aircraft receiver must be linear, are defined for aircraft instrument landing systems by the International Civil Aviation Organization (ICAO), which sets international standards for navigation aids, to which the FAA adheres, as 0.155 DDM (difference in depth of modulation), where DDM is defined as follows:

(% Modulation of One Modulation Frequency) - (% Modulation of Other Modulation Frequency) /100

The FAA requires that the aircraft receiver provide a generally linear response between a positive 0.155 DDM and a negative 0.155 DDM deviation or offset from the desired course path.

In many applications, however, the course width of a navigation system corresponding to the 0.155 DDM limits will be too narrow for stable navigation using a standard receiver. When, for instance, the localizer transmitter is placed near that end of the landing runway nearest the approaching aircraft, it has been found that the aircraft's standard ILS indicating system frequently "loses" the desired landing path. A slight drift in position, particularly as the aircraft gets very close to the runway will peg the needle, thus creating doubt in the pilot's mind as to how far off course he is, and how much correction is needed. The pilot, in response, might initiate an over-correction which will peg the needle in the opposite direction. This sensitivity is due to the decreasing offset distance over which the indicator will read as the airplane approaches the source of the navigation beams. With a narrow course width the system thus tends to become too sensitive as the airplane approaches the touchdown portion of landing.

Accordingly, it is a general object of the present invention to provide a modulation course adjustment method and apparatus which overcomes the disadvantages of prior art navigation systems outlined above.

It is another object of the present invention to provide such a modulation course adjustment method and apparatus to widen or narrow the course width defined by a given DDM.

It is a further object of the present invention to provide such a modulation course adjustment method and apparatus to widen or narrow the course width of a navigational system without modifying associated receiving and indicating equipment on an aircraft or similar maneuverable apparatus.

It is yet another object of the present invention to provide such a modulation course adjustment method and apparatus to widen or narrow the course width of a navigation system without altering the carrier beam pattern.

The related object of the present invention is to provide such a modulation course adjustment method and apparatus which permits the use of a single transmitter installation for both localizer and glide slope information in an aircraft instrument landing system positioned near the approach end of a landing runway.

SUMMARY OF THE INVENTION

Accordingly, one aspect of the invention includes the generation of first and second guidance beams, each guidance beam having the same carrier frequency, the first guidance beam being modulated by a first modulation frequency and the second guidance beam being modulated by a second modulation frequency. The first and second guidance beams are projected into space in a manner such that they lie substantially in a single place and overlap one another, the overlapping of the two guidance beams defining a guidance path in said first plane along a directional axis which is further defined by equal signal magnitudes of the respective modulation frequencies in said first and second modulated beams. The position of an aircraft or other maneuverable apparatus relative to the guidance path within the region covered by the overlapped beams may be determined by detecting the signal level of the modulation frequencies of both guidance beams at the position of the aircraft, and determining the difference in the modulation signal levels between the two detected modulation frequencies. The modulation course pattern is adjusted by altering the signal level of said first and second modulation frequencies in each projected beam throughout the region covered by the overlapping beams without altering the directional axis defining the guidance path, thus decreasing or increasing the magnitude of the difference in the modulation frequency signal levels at any position covered by the overlapped beams.

More specifically, in accordance with an illustrative embodiment, the signal levels of the first and second modulation frequencies in the projected beams are altered by taking a portion of the first modulation signal from the remainder thereof, and a portion of the second modulation signal from the remainder thereof, and combining the portion of the first modulation signal with the remainder of the second modulation signal for modulation of the second guidance beam, and combining the portion of the second modulation signal with the remainder of the first modulation signal for modulation of the first guidance beam.

In another aspect of the invention, the portions of the first and second modulation signals are reversed in phase substantially 180° before they are combined with the remainder of the second and first modulation signals, respectively, before modulation of the first and second guidance beams.

DESCRIPTION OF THE DRAWINGS

A more thorough understanding of the invention may be obtained by a study of the following detailed description taken in connection with the accompanying drawings in which:

FIG. 4 is a block diagram of a receiver useful with the transmitter of FIG. 3 in a navigation system.

FIG. 5 is a plan view of localizer beam patterns in an instrument landing system showing various localizer modulation signal levels, with and without cross-modulation.

FIG. 6 is a schematic diagram of the circuit of the preferred embodiment used to achieve positive cross-modulation of the overlapping beams.

FIG. 7 is a schematic diagram of a circuit of an alternative embodiment to achieve negative cross-modulation of the overlapping beams.

DESCRIPTION OF THE PREFERRED EMBODIMENT

Figure 1:
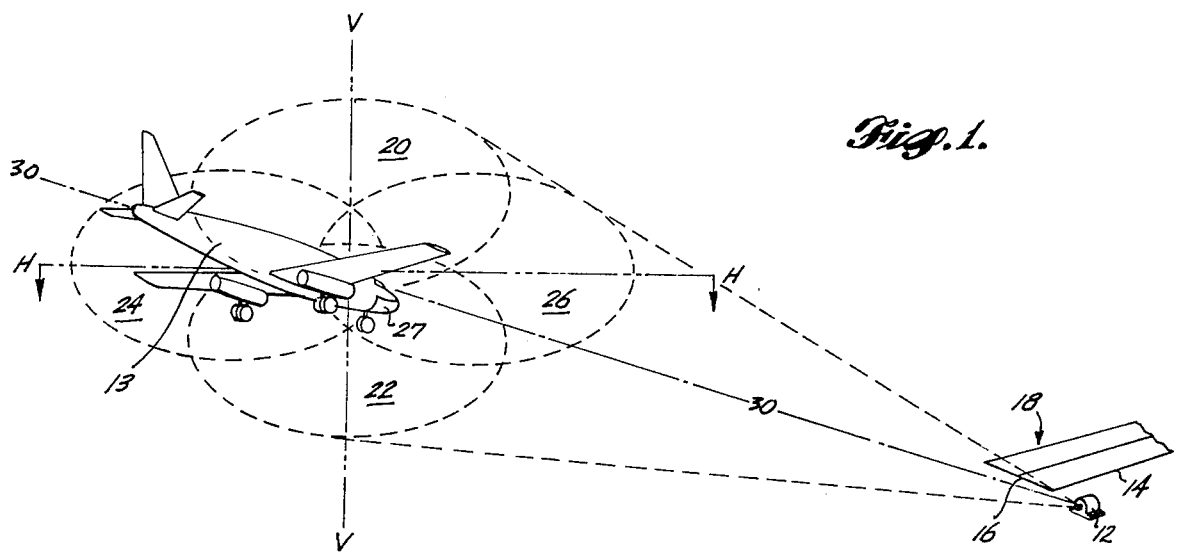
FIG. 1 is a diagram of an instrument landing system showing the relationship between a landing runway, an approaching aircraft, and an overlapping beam pattern providing navigational information.

Although useful in other navigational systems, the preferred embodiment is specially adapted for use in an instrument landing system (ILS) for aircraft. FIG. 1 illustrates generally the concept of an ILS.

As shown in FIG. 1, the transmitter 12 of an ILS for aircraft may be positioned slightly to one side 14 of, and near the approach end 16 of landing runway 18. The transmitter 12 projects overlapping modulated beams providing glide slope and localizer information to an approaching aircraft 13. As shown in FIG. 1, both the glide slope beams 20 and 22, and the localizer beams 24 and 26 may be generated by a colocated (i.e. single antenna installation) antenna arrangement at the transmitter 12 location, or they may be generated at separate locations relative to the runway 18. Transmitter 12 will generate the orthogonal glide slope and localizer beams 20, 22, 24, and 26 about a desired landing plan 30—30, with beams 20 and 22 providing the glide slope information along vertical axis V—V, and beams 24 and 26, providing localizer information along horizontal axis H—H.

Glide slope beams 20 and 22 have a carrier frequency of 5.01 GHz, and localizer beams 24 and 26 a carrier frequency of 5.23 GHz in the preferred embodiment, although other carrier frequencies can obviously be used with good results. Glide slope beam 20 and localizer beam 24 are both amplitude modulated by a 90 Hz signal, while glide slope beam 22 and localizer beam 26 are both amplitude modulated by a 150 Hz signal. The modulated beams 20, 22, 24, and 26 will overlap one another in space, and will define, along equal modulation signal level points, the desired landing path 30—30 for the aircraft 13. A receiver 27 in the aircraft 13 detects the relative signal levels of the modulation signals at the aircraft's physical location in space with respect to the glide slope beams 20 and 22 and the localizer beams 24 and 26. When the detected levels of the modulation signals of glide slope beams 20 and 22 are equal, the aircraft is correctly oriented in the vertical or up-down direction V—V for landing, and when the detected levels of the modulation signals of localizer beams 24 and 26 are equal, the aircraft is correctly oriented in the horizontal or azimuth direction H—H for landing. When both glide slope and localizer positions are correct, the aircraft 13 is on the desired landing path 30—30 to runway 18.

In navigational systems, such as an instrument landing system for aircraft, the shape of the glide slope and localizer beams are frequently tailored to provide optimum beam coverage over a given area in space and to prevent undesirable interference through beam reflection from adjacent natural or manmade objects. Techniques and apparatus for so tailoring beams in an ILS for aircraft are disclosed in U.S. Pat. No. 3,798,646, entitled "Continuous-Wave Multiple-Beam Airplane Landing System" to Buehler et al and assigned to the same assignee as the present invention, and in U.S. Pat. No. 3,815,140, entitled "Multiple Feed for Microwave Parabolic Antennas," to Buehler, et al, and also assigned to the same assignee as the present invention.

As explained above, the response limitations on the aircraft's receiver and associated indicator determine the boundaries of the course width with respect to both glide slope and localizer beams. Typically, the course width boundaries are defined by the linear operating response range of the on-board aircraft receiver, with the indicator being matched to the receiver such that at the opposite ends of the linear response of the receiver, the indicator will be pegged at its opposing scale ends. For instance, when the aircraft is far enough offset from the desired landing path that a 0.155 DDM (difference in depth of modulation) is detected by the receiver, the indicator needle is pegged. An aircraft position farther offset from the desired landing path will result in a larger DDM, which will force the receiver into nonlinear operation, but will not result in further needle movement. The limits of linear operation of the aircraft receiver in an ILS thus define the course width or "window" within which the aircraft must be positioned relative to the desired landing path for the glide slope and localizer readings to be other than pegged. If the aircraft is outside the course width boundaries, the indicator needle will remain pegged and the pilot has no way of knowing how close the aircraft is to the boundaries.

Figure 2:
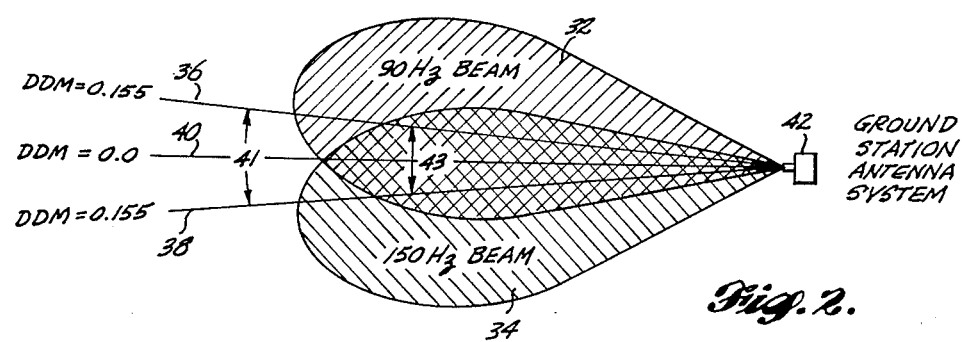
FIG. 2 is a section view of the two modulated beams providing the localizer (azimuth) information in the beam pattern of FIG. 1, taken along lines H—H in FIG. 1, and illustrating localizer course width boundaries.

FIG. 2 illustrates the concept of course width for a pair of localizer beams 32 and 34, beam 32 being modulated by a 90 Hz signal, and beam 34 by a 150 Hz signal. The 0.155 DDM boundary lines 36 and 38 on either side of the localizer equal signal point line 40 radiate from transmitter 42 and define the horizontal deviation permitted to the aircraft before its indicator is pegged. As the aircraft approaches the transmitter 42, and hence the runway, the lateral distance 43 between the two boundary lines 36 and 38 decreases although the included course width angle 41 remains the same. Very near the transmitter 42, a slight veering of the aircraft from the desired landing path will place the aircraft outside the localizer window defined by boundary lines 36 and 38 and thus peg the needle on the localizer indicator. This loss of meaningful indicator reading, either in glide slope or localizer, is potentially dangerous to the safe landing of the aircraft. Furthermore, as the runway is approached, the magnitude of the deviation necessary to lose the glide slope or localizer window becomes smaller, and the requirement of aircraft stability increasingly acute.

Figure 3:
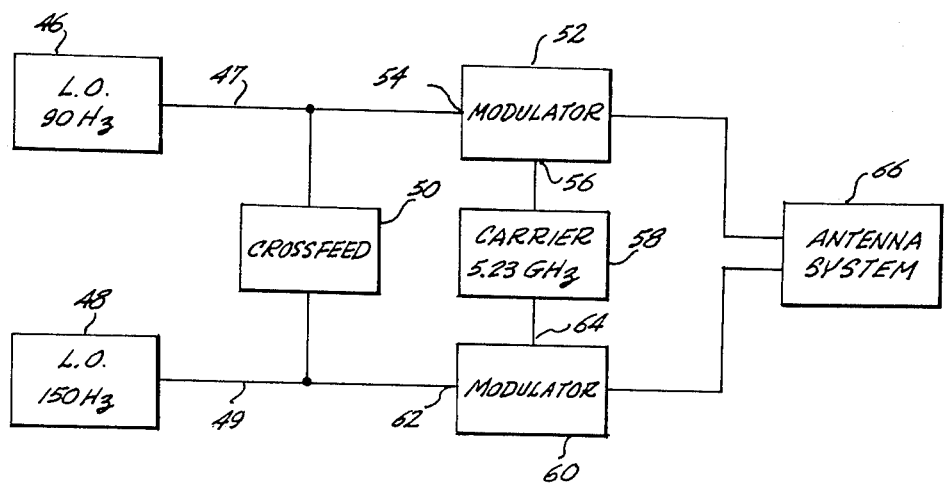
FIG. 3 is a block diagram of a transmitter for generating an overlapping beam pattern for navigational information, including the circuit of the preferred embodiment.

Referring to FIG. 3, apparatus of a preferred embodiment in the context of an ILS transmitter is illustrated in block diagram form. Although the block diagram of FIG. 3 relates to the generation of localizer beams, where the course width problem is most acute, it can apply equally well to glide slope circuitry. A 90 Hz signal is generated by local oscillator 46, and applied on output line 47, and a 150 Hz signal is generated by local oscillator 48, which is applied on output line 49. A portion of each of the 90 Hz and 150 Hz signals, on lines 47 and 49, respectively, is then subtracted or split from the remainder of the 90 Hz and 150 Hz signals and applied to the other output line by cross feed circuit 50. Thus, a portion of the 150 Hz signal from oscillator 48 on line 49 is added to the 90 Hz signal on line 47, and a portion of the 90 Hz signal from oscillator 46 on line 47 is added to the 150 Hz signal on line 49.

Modulator 52 has two inputs 54 and 56. Line 47 is connected to input 54 while the localizer carrier signal, from carrier source 58, is applied to input 56. The signal on line 47, which modulates the localizer carrier, is predominantly 90 Hz with a portion of 150 Hz. Modulator 60 also has two inputs, 62 and 64. Line 49 is connected to input 62, while the localizer carrier signal from carrier source 58 is applied to input 64. The signal on line 49 which modulates the localizer carrier is predominantly 150 Hz with a portion of 90 Hz. To achieve symmetrical cross-modulation, the portion of the 90 Hz signal applied to line 49 is identical in signal level to the portion of the 150 Hz signal applied to line 47. The respective modulated output signals from modulators 52 and 60 are then applied to the ILS antenna system 66 for transmission.

The cross-modulation between the 90 Hz signal on line 47 and the 150 Hz signal on line 49 may be achieved in a number of different ways, including cross-feeding at the respective local oscillators or subsequent to modulation.

FIG. 6 illustrates an embodiment of the cross feed circuit shown in block form in FIG. 3, which uses a variable resistance 61 in series with a switch 63, connected between output line 65 from 90 Hz local oscillator 67 through resistance 69, and output line 71 from 150 Hz local oscillator 73 through resistance 75. When the switch 63 is closed, the variable resistance 61 operates with resistances 69 and 75 as a voltage divider with respect to each of the modulation signals, 90 Hz and 150 Hz. Thus, that portion of the total 90 Hz signal from oscillator 67 corresponding to the ratio between the value of variable resistance 61 and resistance 69 is added to the 150 Hz signal on line 70, while that portion of the total 150 Hz signal from oscillator 73 corresponding to the ratio between the value of variable resistance 61 and resistance 75 is added to the 90 Hz signal on line 65. As noted above, the signal levels of each cross-modulated signal portion are preferably substantially equal to achieve symmetrical cross-modulation, such that the total modulation signal level (percent of modulation) remains the same for each beam as without cross-modulation. Operational amplifiers 76 and 78, with their respective feedback resistances 77 and 79, receive the total modulation signals on lines 65 and 71 at their inverting inputs and function as summing amplifiers.

In certain circumstances, it may be desirable for the cross-modulation to be asymmetrical. This can be achieved by providing two signal paths between output lines 65 and 71, with each signal path including circuit components which may be adjusted for control of cross-modulation of each modulation signal. For instance, each signal path could include a non-inverting amplifier having a variable gain adjustable to provide the amount of cross-modulation desired from each output line.

The outputs from amplifiers 76 and 78 are modulated and transmitted as localizer or glide slope beams to a receiver in an aircraft. Positive cross-modulation, that is, in phase cross-modulation, increases the course width of a given ILS system, other variables remaining the same, because for a given aircraft positional offset from the desired landing course, the signal level of the dominant or stronger modulation signal will be lower than without cross-modulation, and the signal level of the secondary or weaker modulation signal will be grater than without cross-modulation. Thus, an aircraft position having a given DDM may be further offset from the desired landing course when the modulation signals are cross-modulated.

As an example, assume that without positive cross-modulation, the aircraft is in a first position relative to the desired localizer landing course where 2.0 volts of 90 Hz signal are detected by the aircraft receiver and 1.0 volts of 150 Hz. This results in a DDM of some known value. However, with positive cross-modulation, a portion of the 90 Hz signal from the 90 Hz local oscillator is mixed in phase with the remainder of the 90 Hz signal with the 150 Hz signal from the 150 Hz local oscillator, and vice-versa. Assume that the predominant signal in each output line from the local oscillators at the conclusion of the cross feed (before transmission) has been reduced by 10 percent. In the example immediately above, with 10 percent cross-modulation and the aircraft in the first position, the receiver will detect 1.8 volts of 90 Hz and 0.2 volts of 150 Hz from one beam, and 0.9 volts of 150 Hz and 0.1 volts of 90 Hz in the other beam. The combined signal levels will be 1.9 volts of 90 Hz and 1.1 volts of 150 Hz, resulting in a reduced DDM for the same first position of the aircraft. Thus, for a predetermined DDM, the course width of the navigation system is increased.

FIG. 4 illustrates, in block diagram form, a receiver which is capable of processing the beam energy generated by the transmitter of FIG. 3 into corresponding electrical signals which drive an indicator, the position of the indicator needle being representative of the position of the aircraft or other apparatus relative to the desired landing path. The receiver shown in FIG. 4 is a conventional ILS receiver, as a special receiver is not required to process the cross-modulation signals present in the received beams. The beam energy produced by the transmitter is received by antenna 90, which applies the received signal energy to a normalizer circuit 92, which adjusts the amplitude of the received signals to a predetermined level. The adjusted signal output of normalizer 92 is in turn applied to a detector circuit 94, which is responsive to the carrier frequency of the two signals to demodulate the two signals and provides an output signal which contains the respective modulating signals present in each beam. This composite signal is then applied to a 90 Hz filter 96 and a 150 Hz filter 98, the 90 Hz filter 96 passing the 90 Hz components present in the modulating signals of both received beams while the 150 Hz filter 98 passes the 150 Hz components of each beam modulating signal. The total 90 Hz and total 150 Hz signals are then applied to respective level detectors 100 and 102 which provide DC output signals, having magnitudes which vary proportionately to the amplitude of the AC signal applied at their respective inputs. The outputs of the respective level detectors 100 and 102 are then applied to a difference amplifier 104, the output of which controls an indicator circuit 106.

In operation, when an aircraft is on the desired landing path, the magnitudes of the DC outputs from 90 Hz level detector 100 and 150 Hz level detector 102 will be equal, and the indicator needle 108 will read middle scale, or zero. However, as the aircraft strays to one side or the other of the desired landing path, the magnitude of the signal from the 90 level detector 100 will exceed the magnitude of the signal from the 150 Hz level detector 102, or vice-versa, and the indicator needle 108 will move toward one end of the indicator scale. A similar receiver apparatus and indicator are provided for glide slope information in an aircraft instrument landing system.

Due to positive cross-modulation, the signal level of the dominant modulation signal is depressed, and the signal level of the secondary modulation signal is increased, relative to "pure" or noncross modulated signals, as explained above. The magnitude of the decrease in the dominant modulation signal level and corresponding increase in the secondary modulation signal level is determined by the amount of signal originally cross-fed from each modulation frequency at the transmitter.

The effect of positive cross-modulation on the modulation course pattern of a pair of radiated localizer beams is shown in FIG. 5. Beam 80 for the 90 Hz modulation and beam 82 for the 150 Hz modulation are shown for reference purposes to illustrate modulation signal levels when each beam is modulated by a single-frequency, signal, i.e., no cross-modulation. With positive cross-modulation, however, a portion of each modulation signal is cross-fed to the other beam, thereby reducing the dominant modulation signal level in each beam. Beam 113 illustrates the reduced level of the 90 Hz dominant modulation beam and beam 115 illustrates the reduced level of the 150 Hz dominant modulation beam. For purposes of illustration and clarity, a significant reduction in modulation signal level for each beam is shown.

Beam 114 represents the signal level of the 90 Hz signal portion which is cross-modulated into the 150 Hz dominant beam while beam 116 represents the signal level of the 150 Hz signal portion which is cross-modulated into the 90 Hz dominant beam. As shown diagrammatically in FIG. 5, composite beam 118 is formed by vectorially adding beams 115 and 114, while composite beam 120 is formed by vectorially adding beams 113 and 116.

The modulation course width of composite beams 118 and 120, which are cross-modulated, is considerably different for given DDM boundaries than the modulation course width of noncross modulated beams 80 and 82. An inspection of the beam relationships of FIG. 5 will verify the adjustment in modulation course width, as follows.

The magnitude of DDM at any offset position can be determined from a beam plot (FIG. 5) by measuring the straight line distance between the respective beam outlines for the navigation course which the aircraft is following. Referring to FIG. 5, a distance 110 has been found to correspond to a DDM of 0.155. Navigation course lines 124 and 126 are shown for a DDM of 0.155 for noncross modulated beams 80 and 82. The navigation course lines 124 and 126 thus define the course width boundaries between which the aircraft must fly to maintain a meaningful reading on the aircraft indicator associated with that pair of beams.

Positive cross-modulation, however, significantly widens the course width. Navigation course lines 128 and 130 are shown for a DDM of 0.155 for composite beams 118 and 120, with the straight line distance 112 between beam outlines 118 and 120 being equal to straight line distance 110 for beams 80 and 82. Thus, with positive cross-modulation, the offset of the aircraft from a desired course 132 may be considerably increased within the linear response of the aircraft receiver and associated indicator for a predetermined DDM.

The circuit shown in FIG. 6 and discussed above is used to accomplish positive cross-modulation, that is, widening of the course width, by cross feeding in-phase modulating signals. The 90 Hz portion on 150 Hz line 71 is in phase with the 90 Hz signal on line 65, and the 150 Hz portion on 90 Hz line 65 is in phase with the 150 Hz signal line 71. The opposite of positive cross-modulation, negative cross-modulation, which is used to adjust the modulation course pattern to narrow the course width, can be accomplished by reversing the phase of the cross-modulated signals relative to the remainder of the modulation signals of the same frequency. Referring now to FIG. 7 showing in schematic form a circuit for accomplishing negative cross-modulation, oscillators 130 and 132 generate 90 Hz and 150 Hz modulation signals, respectively. The output of oscillator 130 is connected on line 134 through resistor 136 to the inverting input 138a of amplifier 138, which is connected as a summing amplifier. Oscillator 132 is connected on line 140 through resistor 142 to the inverting input 144a of summing amplifier 144. The outputs of summing amplifiers 138 and 144 are connected to the modulators (not shown) of the guidance beams. Variable resistances 146 and 148 are connected from the outputs of summing amplifiers 138 and 144 to the inverting inputs 138a and 144a thereof, respectively, the variable resistances 146 and 148 being used to provide a variable gain at the output of each summing amplifier for reasons to be explained in following paragraphs.

Connected between output lines 134 and 140 is the cross feed circuit shown generally at 150. The cross feed circuit 150 includes an inverting amplifier 152 which provides the required phase reversal for the cross-fed signals between the respective output lines 134 and 140. The output of the inverting amplifier 152 is connected through resistance 153 to the inverting input 138a of summing amplifier 138 and through resistance 154 to the inverting input 144a of summing amplifier 144. Connected between the ouput of inverting amplifier 152 and the inverting input 152a thereof is a variable feedback resistance 158 which controls the gain of the inverting amplifier 152 for purposes of varying the amount of cross-modulation between the 90 Hz and 150 Hz output lines 134 and 140.

The inverting input 152a of inverting amplifier 152 is also connected to a circuit midpoint between identical resistances 160 and 162, resistances 160 and 162 having common ends 160a and 162a, the other ends of which resistances are connected to the outputs of oscillators 130 and 132, respectively. In operation, the signal existing at the circuit midpoint between resistances 160 and 162, which is common to the inverting input 152a of inverting amplifier 152, is a composite of one-half 90 Hz signal from line 134 and one-half 150 Hz signal from line 140. The signal present between resistances 160 and 162 is then amplified by inverting amplifier 152, which achieves the necessary phase reversal, the output signal of which is then applied, as noted above, to both the inverting input 138a of amplifier 138 and the inverting input 144a of summing amplifier 144. Summing amplifier 138 operates to subtract the cross-modulated phase-reversed 90 Hz component of the output signal of amplifier 152 from the remaining 90 Hz signal on line 134, and includes therewith the phased-reversed 150 Hz component. Summing amplifier 144 subtracts the cross-modulated phase-reversed 150 Hz component from the remaining 150 Hz signal on line 140, and includes therewith the phase-reversed cross-modulated 90 Hz signal. The gain of amplifiers 138 and 144 may be adjusted by variable feedback resistors 146 and 148, respectively, such that the levels of the composite signals consisting of 90 Hz and 150 Hz modulating signals may be brought to any level required, and may, if desired, be made equal to one another.

The outputs of the summing amplifiers 138 and 144 are then used to modulate carrier beams which are transmitted into space in a similar overlapping fashion to that of beams with positive cross-modulation. In the detection of the modulation signal levels, each of the phase-reversed, cross-modulated secondary signals will be subtracted from their corresponding dominant modulation signals resulting in an increase in difference between the total modulation signal levels of the two modulation frequencies, thus increasing the DDM for a given position relative to the guidance path. The greater the percentage of signal that is cross-fed, the greater the effect on the course width, and the narrower the modulation course width will be.

Thus, by means of cross-modulation, the course width "window" over which an aircraft or similar apparatus may be accurately located, may be increased or decreased. It should be recognized that navigational systems other than ILS may utilize receivers and indicators having different response characteristics and which may provide linear response and thus linear indication for different ranges of DDM, and that the present invention is not limited to ILS applications. The altering of modulation course width in the manner of the preferred embodiment may be carried out at the transmitter conveniently and in a practical and inexpensive manner, without the necessity of altering or in any other way modifying receiving and indicating equipment on the aircraft or other apparatus. Furthermore, such altering may be accomplished without the necessity of altering in any way the transmitter antenna configuration.

Although an exemplary embodiment of the invention has been disclosed herein for purposes of illustration, it will be understood that various changes, modifications and substitutions may be incorporated in such embodiment without departing from the spirit of the invention as defined by the claims which follow.

What is claimed is:

1. A method for adjustment of modulation course width in a guidance system for a maneuverable apparatus, comprising the steps of:
    generating first and second modulation signals having respectively different frequencies;
    separating each of said first and second modulation signals into a first portion and a remainder portion;
    combining said first portion of said first modulation signal with said remainder portion of said second modulation signal, and combining said first portion of said second modulation signal with said remainder portion of said first modulation signal, thereby forming first and second composite modulation signals;
    generating a carrier signal;
    modulating said carrier signal with said first composite modulation signal to produce a first modulated carrier signal and modulating said carrier signal with said second composite modulation signal to produce a second modulated carrier signal; and,
    transmitting said first and second modulated carrier signals into space such that they overlap one another, thereby defining a guidance path for maneuverable apparatus along a directional axis in space in which the summed signal levels of said portions of said first modulation signal equals the summed signal levels of said portions of said second modulation signal on said modulated carrier signals, and defining a course width for said maneuverable apparatus in which the difference between said summed signal levels of said portions of said first modulation signal and said summed signal levels of said portions of said second modulation signal on said modulated carrier signals is no greater than a predetermined magnitude.

2. The method of claim 1, wherein said first portions of said first and second modulation signals have substantially identical signal levels and wherein said remainder portions of said first and second modulation signals have substantially identical signal levels.

3. A method of claim 2, wherein the signal levels of said first portions of first and second modulation signals are substantially below the signal levels of the remainder portions of the first and second modulation signals.

4. The method of claim 3, wherein the frequencies of said first and second modulation signls, respectively, are 90 Hz and 150 Hz.

5. The method of claim 1, wherein said first portions of said first and second modulation signals are in phase with the respective remainder portions thereof.

6. The method of claim 1, wherein said first portions of said first and second modulation signals are substantially 180° out of phase with the respective remainder portions thereof.

7. The method of claim 6, wherein said first portion of said first modulation signal is also summed with the remainder portion of said first modulation signal and said first portion of said second modulation signal is also summed with said remainder portion of said second modulation signal.

8. The method of claim 7, wherein said first portions of said first and second modulation signals have substantially identical signal levels and said reminder portions of said first and second modulation signals have substantially identical signal levels.

* * * * *

UNITED STATES PATENT OFFICE
CERTIFICATE OF CORRECTION

Patent No. 3,496,387             Dated February 17, 1970

Inventor(s) Bunjiro Saito

It is certified that error appears in the above-identified patent and that said Letters Patent are hereby corrected as shown below:

Column 2, lines 66 and 67 read as --Upon completion of discharging the first capacitor 41, the first capacitor is charged again with the input current $I_i$. --.

Signed and sealed this 23rd day of March 1971.

(SEAL)
Attest:

EDWARD M. FLETCHER, JR.
Attesting Officer

WILLIAM E. SCHUYLER, JR.
Commissioner of Patents